United States Patent [19]
Floyd

[11] Patent Number: 5,717,531
[45] Date of Patent: Feb. 10, 1998

[54] RACING MIRROR

[76] Inventor: Roy R. Floyd, 19409 Waldron, Roseville, Mich. 48066

[21] Appl. No.: 501,719

[22] Filed: Jul. 19, 1995

[51] Int. Cl.⁶ ............................. G02B 5/08; G02B 7/182; B60R 1/00; B60Q 1/26
[52] U.S. Cl. .......... 359/838; 359/843; 359/872; 340/425.5; 340/435; 340/468
[58] Field of Search ................... 359/838, 841, 359/843, 872; 340/425.5, 435, 438, 467, 468, 309.15, 323 R

[56] References Cited

U.S. PATENT DOCUMENTS

| | | | |
|---|---|---|---|
| 1,311,253 | 7/1919 | Stern | 359/838 |
| 1,576,793 | 3/1926 | Sadler . | |
| 1,879,592 | 9/1932 | Thomas | 359/838 |
| 2,085,000 | 6/1937 | Borba et al. . | |
| 2,764,913 | 10/1956 | Green | 359/855 |
| 3,394,979 | 7/1968 | Wilson . | |
| 3,665,392 | 5/1972 | Annas . | |
| 4,023,029 | 5/1977 | Fischer | 359/838 |
| 4,668,059 | 5/1987 | Ohyama . | |
| 4,681,409 | 7/1987 | Enomoto . | |
| 4,911,545 | 3/1990 | Miller | 359/841 |
| 4,940,320 | 7/1990 | Tribble . | |
| 4,970,493 | 11/1990 | Yim . | |
| 5,073,019 | 12/1991 | Ferreira do Espirito Santo . | |
| 5,253,115 | 10/1993 | Ueno | 359/838 |
| 5,292,100 | 3/1994 | Byers et al. . | |
| 5,355,255 | 10/1994 | Assinder . | |
| 5,418,610 | 5/1995 | Fischer | 359/838 |

FOREIGN PATENT DOCUMENTS

| | | | |
|---|---|---|---|
| 2148022 | 3/1973 | Germany | 359/838 |
| 0179350 | 9/1985 | Japan | 359/841 |
| 0146654 | 7/1986 | Japan | 359/841 |

*Primary Examiner*—Ricky D. Shafer
*Attorney, Agent, or Firm*—Harness, Dickey & Pierce, P.L.C.

[57] ABSTRACT

A racing mirror apparatus having a plurality of markings on the reflecting surface of the mirror which correspond to estimated sizes of the reflection of a vehicle which is trailing the racing vehicle at a plurality of predetermined distances. The racing mirror is disposed in an opening in the lower panel portion of a side door. The mirror apparatus is adjustable to various angular positions which provide reflections of a trailing vehicle at a location corresponding to an estimated position of the trailing vehicle at a predetermined time or place in a bracket race. The racing mirror apparatus allows the driver of a slower vehicle in a bracket race to determine whether he needs to speed up, slow down, or maintain his present speed in the race.

20 Claims, 5 Drawing Sheets

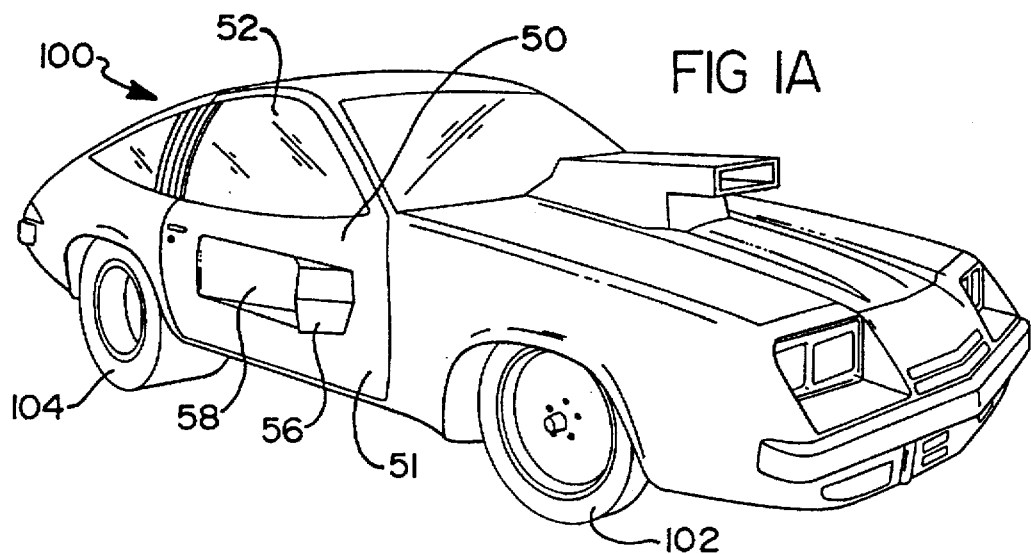
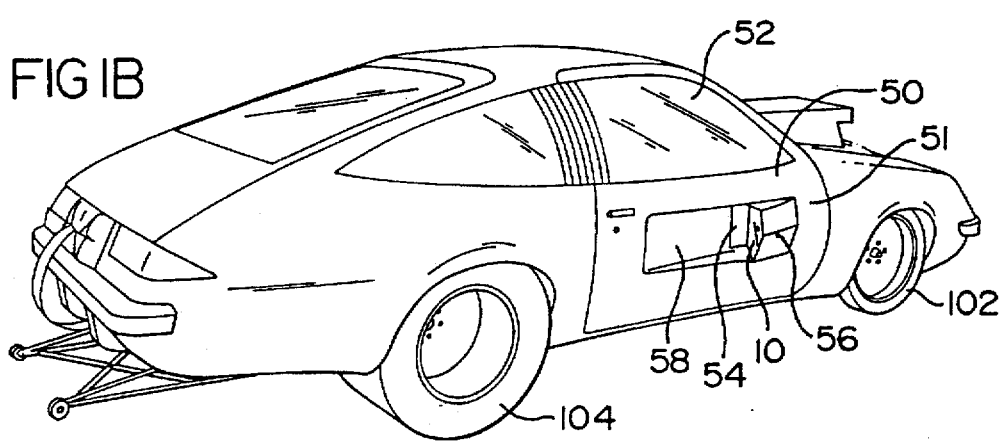
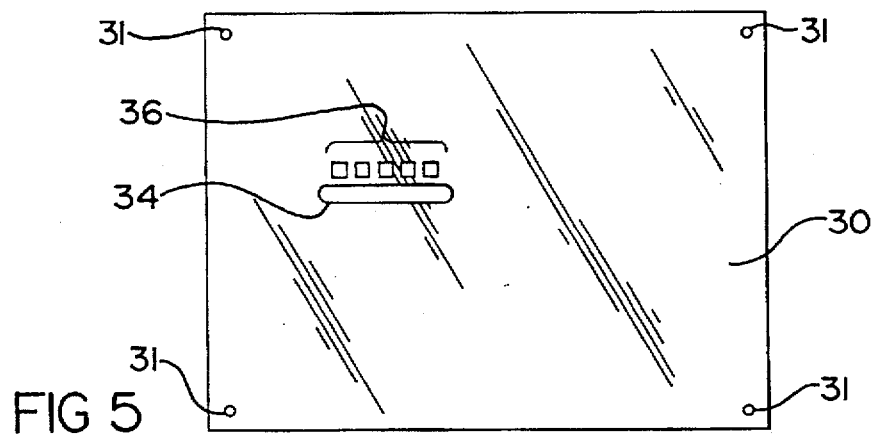

FIG 8
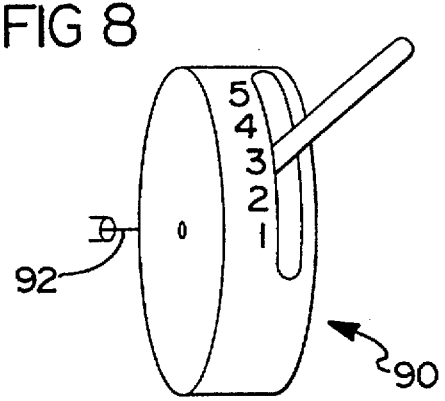
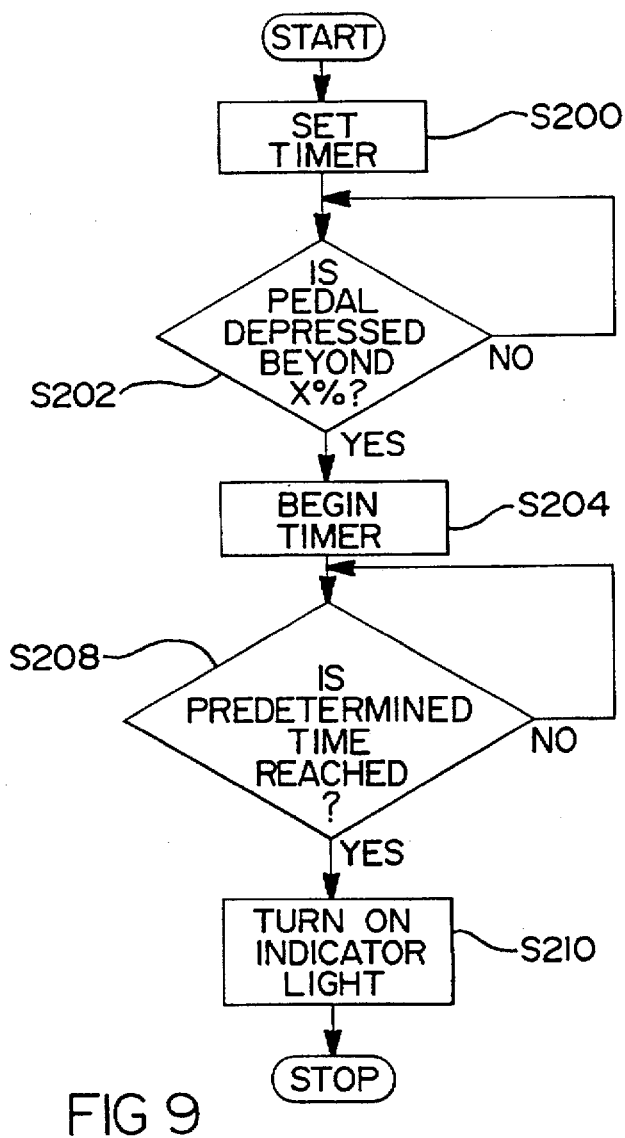
FIG 9

RACING MIRROR

BACKGROUND OF THE INVENTION

1. Field of the Invention

The present invention relates generally to a racing mirror and, more particularly, to a racing mirror for use in a bracket racing vehicle for estimating a distance at which a trailing vehicle is located.

2. Description of the Background Art

As is known, rearview mirrors are used in vehicles for determining where other trailing vehicles are located on the road. Commonly known mirrors include mirrors which are located on the exterior of the vehicle towards the front of the driver and passenger side windows. It is also known to have a rear view mirror mounted to the center portion of the front windshield. Drivers use these mirrors for determining when it is safe for changing lanes. However, these known mirrors are insufficient for providing an accurate estimation of the location of a trailing vehicle.

In the sport of bracket racing it is common for a slower vehicle to be matched in a race against a quicker vehicle. The quicker vehicle is handicapped by allowing the slower vehicle to have a head start by a predetermined amount of time. The predetermined amount of time is determined based upon the minimum elapsed time that each vehicle driver must estimate and submit to race officials prior to the race. The handicap is determined based upon these estimated minimum elapsed times so that if each vehicle obtains their exact estimated minimum elapsed time both vehicles would cross the finish line simultaneously. In bracket racing, the object is to come closer to your estimated minimum elapsed time than your opponent without finishing in less than your estimated minimum elapsed time. Thus, for the driver of a slower vehicle it is very important to know where the opposing vehicle is located as both vehicles approach the finish line. In order to avoid coming in below the minimum elapsed time, a driver who knows that the opposing vehicle has had a poor start can ease up slightly on the accelerator in order to insure that he will come within his estimated minimum elapsed time. Likewise, a driver who knows that he should finish at a time close to his minimum elapsed time, because he feels he had a good start, and who sees that the opposing vehicle is closer than a predetermined distance, then he will know that the opposing vehicle is likely to finish ahead of it's estimated minimum elapsed time. In which case, the driver knows that he should allow the opposing driver to pass him by with the hope that the opposing vehicle will finish ahead of its minimum elapsed time.

On the other hand, when the driver feels he may have had a poor start, and the opposing vehicle is closer than the predetermined distance, then, the vehicle driver knows that he probably needs to increase the speed of his vehicle in order to prevent the opposing vehicle from passing him.

As seen from the above described scenarios, there is great demand in the field of bracket racing for a racing mirror which allows the driver of a slower vehicle to accurately determine the location of a trailing vehicle.

SUMMARY OF THE INVENTION

Accordingly, it is a primary object of the present invention to provide a unique arrangement for a racing mirror that allows the driver of a slower vehicle in a bracket race to determine with considerable certainty the trailing distance of the opposing vehicle.

It is a further object of the present invention to provide a racing mirror which is adjustable in angular orientation depending upon an approximate location of an opposing vehicle when the vehicles are approaching the finish line.

It is another object of the present invention to provide a racing mirror with at least one set of markings on a reflecting surface thereof which estimates an approximate size of a reflection of a trailing vehicle at one or more predetermined distances.

It is yet another object of the present invention to provide a combination racing vehicle and racing mirror with a mirror mounting location which does not greatly reduce the aerodynamic performance of the racing vehicle.

It is still another object of the present invention to provide a racing mirror apparatus with an indicator device which notifies the driver of a vehicle when he is a predetermined dimension from the finish line.

These and other objects of the present invention are obtained by providing a racing mirror apparatus for use in a racing vehicle, comprising: a reflecting surface having at least one set of markings thereon which corresponds to an estimated size of a reflection of a vehicle which is trailing the race vehicle at a predetermined distance; support means for pivotally supporting the mirror; adjustment means for adjusting an angular position of the mirror with respect to the support means; and indicator means for indicating when the racing vehicle is a predetermined dimension from a beginning of a race.

Additional objects of the present invention are obtained by providing in combination a bracket racing vehicle having a racing mirror, said combination comprising: a racing vehicle having a driver's compartment provided with at least one side door panel including an upper window opening portion and a lower wall portion, said lower wall portion having an opening therein; and a racing mirror including a reflecting surface and support means for supporting said reflecting surface adjacent to said opening in said lower wall portion of said at least one door panel.

Further scope of applicability of the present invention will become apparent from the detailed description given hereinafter. However, it should be understood that the detailed description and specific examples, while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1A and 1B are front perspective and rear perspective side views, respectively, of a vehicle having an opening in a lower wall portion of the passenger side door according to the principles of a preferred embodiment of the present invention;

FIG. 5 is an enlarged view of the transparent plate which goes in front of the reflecting surface according to a preferred embodiment of the present invention;

FIG. 8 illustrates a cable actuator device for adjusting an angular position of the reflecting surface; and FIG. 9 is a flow chart illustrating the operation of the indicator means.

DETAILED DESCRIPTION OF THE PREFERRED EMBODIMENTS

Figure 2:
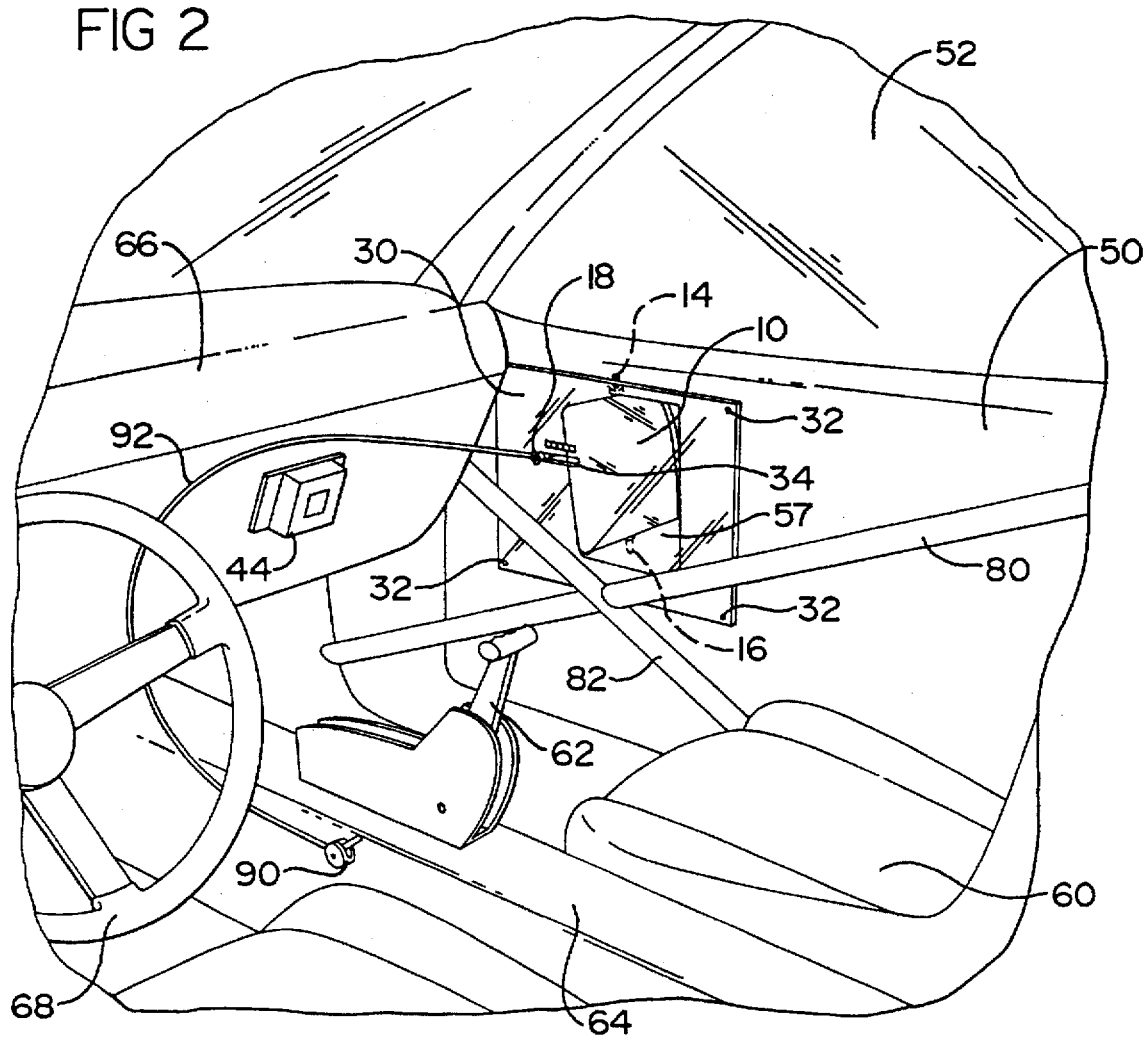
FIG. 2 is a perspective view of the driver's compartment of a vehicle which includes a racing mirror apparatus, according to a preferred embodiment of the present invention, mounted in the internal side of the opening in the door shown in FIG. 1.

The present invention will now be generally described with reference to FIGS. 1A, 1B and 2. In FIGS. 1A and 1B, a racing vehicle 100 is shown which includes front wheels 102 and rear wheels 104. The racing vehicle 100 includes a side door 50. In FIGS. 1A and 1B the passenger side door is shown. However, it is noted that the principles of the preferred embodiment of the present invention can also be applied to the driver's side door of a racing vehicle. The side door 50 has an upper window portion 52 and a lower panel portion 51. An opening 54 is provided in the lower panel portion 51 of the side door 50, as shown in FIG. 1B. A laterally extending housing portion 56 is disposed forward of the opening 54. A reflecting surface 10 is disposed in the opening 54. A recessed portion 58 is provided in the lower panel portion 51 of the side door 50 in a location rearward of the opening 54.

With specific reference to FIG. 2, the interior of the driver's compartment is shown. The reflecting surface 10 of the mirror apparatus is shown disposed partially within a cavity 57 which is defined by the laterally extending housing portion 56. Inside the vehicle compartment are shown the passenger side door 50 having an upper window portion 52. A passenger seat 60 is optionally provided. A shifting lever 62 is provided in a console 64. The vehicle dashboard 66 extends across the front of the driver's compartment, while a steering wheel 68 is provided on the driver's side of the vehicle compartment. Safety bars 80 and 82 are provided on the passenger side door 50.

The mirror apparatus will now be described in detail with respect to FIG. 2 and with specific reference to FIG. 3. The reflecting surface 10 of the mirror apparatus is supported by a shaft 12. The shaft 12 has upper and lower mounting portions 14, 16 which are supported by brackets 40, 42. The shaft 12 is allowed to pivot with respect to the brackets 40, 42. An angle adjusting shaft 18 is connected to the mirror apparatus. The angle adjusting shaft 18 is received in a slot 34 of a transparent plate 30. The transparent plate 30 is mounted to the door 50 as shown in FIG. 2, by a plurality of screws 32. A plurality of numerical position indicators 36 are provided above the slot 34 in the transparent plate 30. The numerical indicators 36 correspond to angular positions of the reflecting surface 10. Each numerical indicator can correspond to different estimated minimum elapsed times of the opposing vehicles.

Figure 4A:
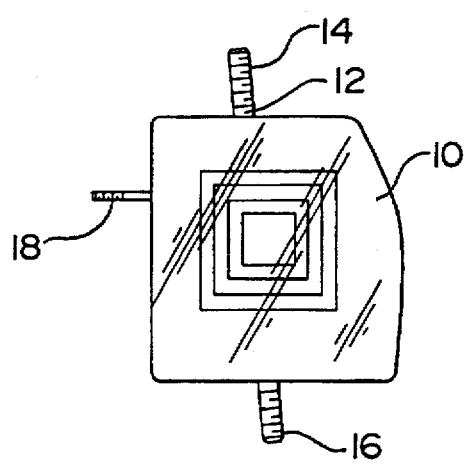
FIG. 4A is a front view of the reflecting surface with the support shaft and adjustment shaft according to a preferred embodiment of the present invention.
Figure 4B:
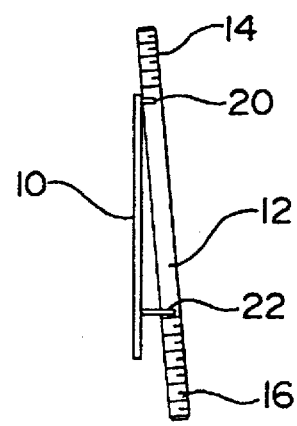
FIG. 4B is a side view of the mirror and the support shaft according to a preferred embodiment of the present invention.

The reflecting surface 10 of the mirror apparatus is connected to the support shaft 12 by mounting brackets 20, 22 as best shown in FIG. 4B.

The transparent plate 30 is separately shown in FIG. 5 having a plurality of holes 31 at each corner, through which the screws 32 are inserted to fasten the transparent plate 30 to the door 50.

Figure 3:
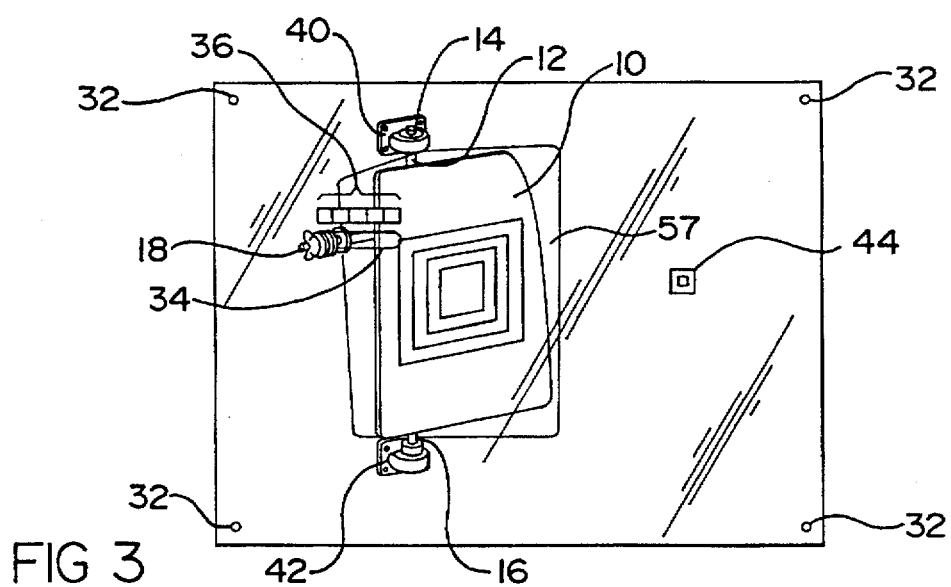
FIG. 3 is a detailed view of the racing mirror apparatus as it is disposed in the opening in the door according to a preferred embodiment of the present invention.

In FIG. 3, an indicator light 44 is shown adjacent to the mirror apparatus. Alternatively, in FIG. 2 the indicator light 44 is shown attached to the dashboard 66 of the vehicle driver compartment.

Figure 6:
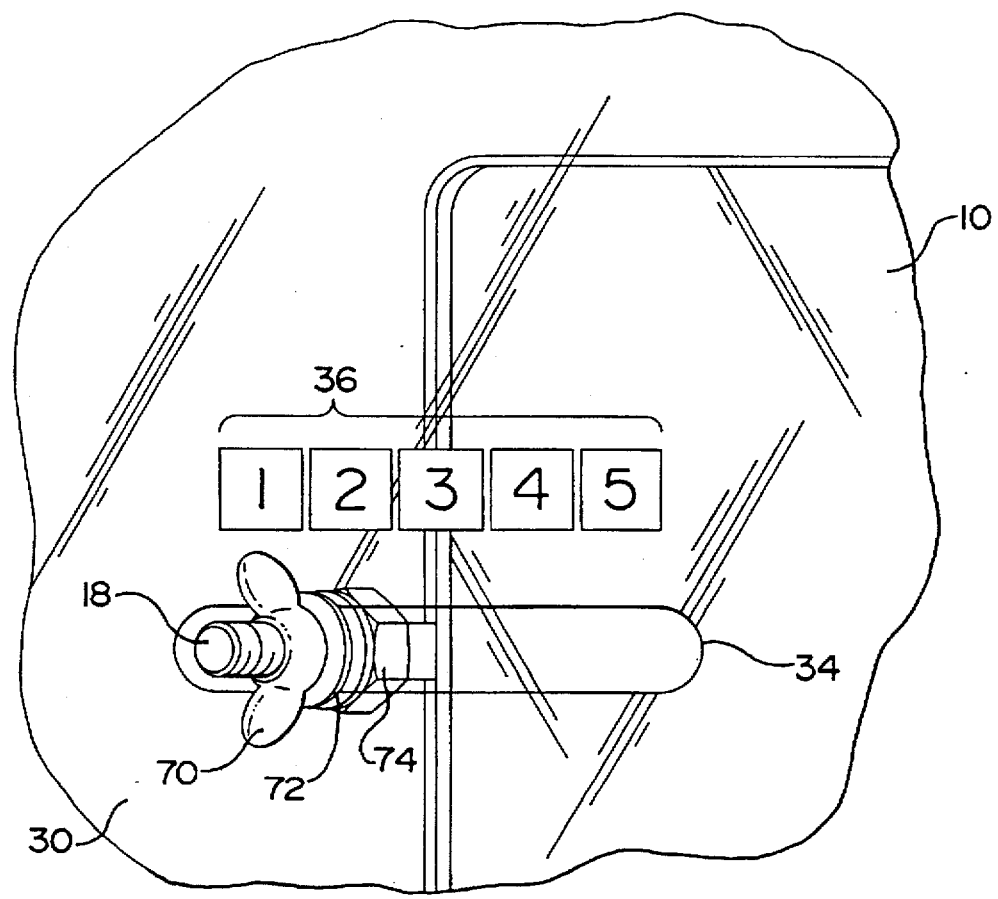
FIG. 6 is an enlarged view of the engagement between the angle adjusting shaft of the mirror apparatus and the slot disposed in the transparent plate according to one embodiment of the present invention.

With specific reference to FIG. 6, the angle adjusting shaft 18 of the mirror apparatus is shown extending through the slot 34 in the transparent plate 30. An adjustable wing nut 70 is shown threaded onto the angle adjusting shaft 18. Inner and outer follower members 72, 74 are disposed on the front and rear surfaces of the transparent plate 30, respectively, in order to hold the reflecting surface in a fixed angular position with respect to the transparent plate 30.

Figure 7:
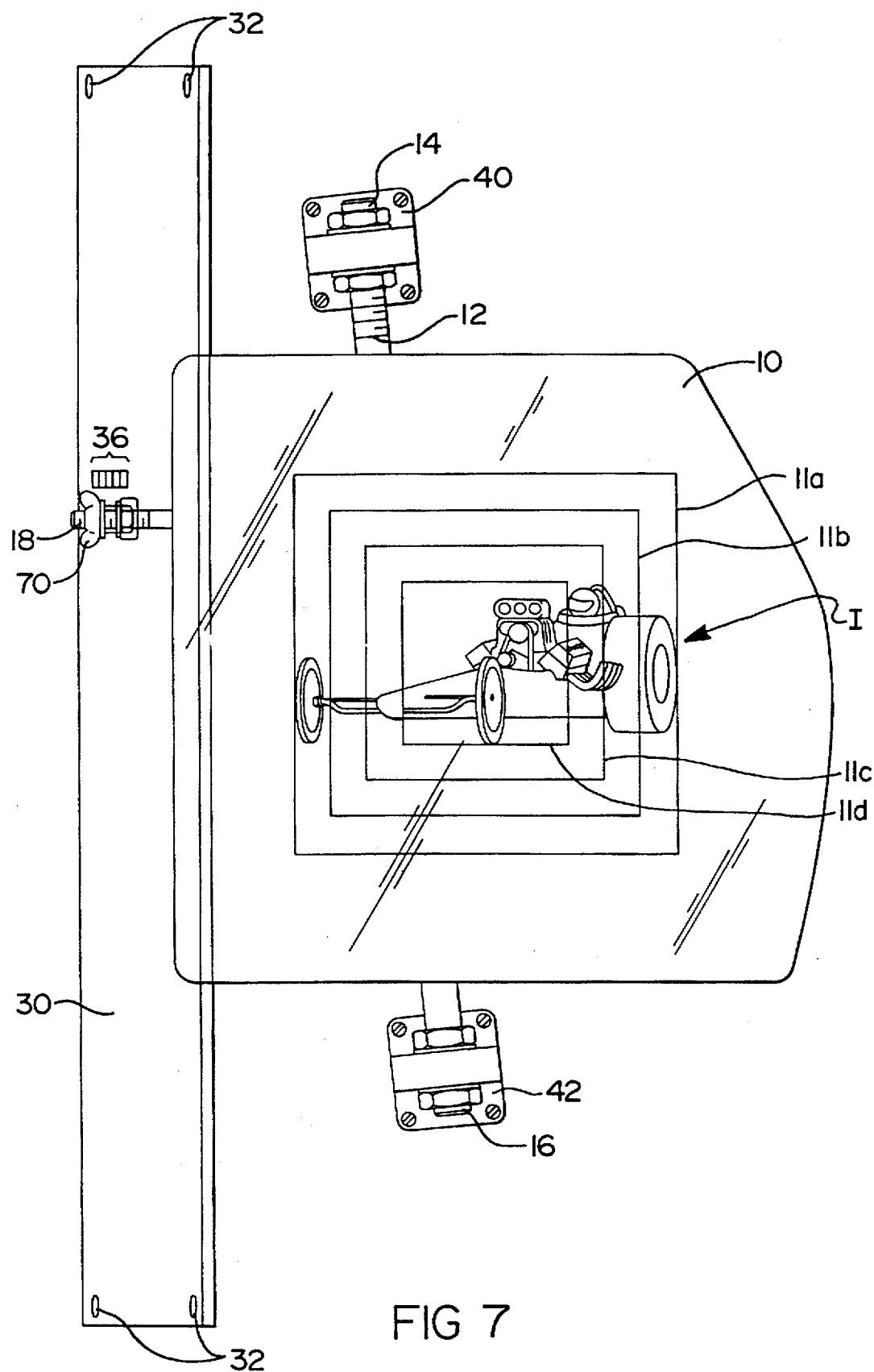
FIG. 7 illustrates how the markings are disposed on the reflecting surface of the mirror and how a trailing vehicle would appear within the markings of the mirror according to a preferred embodiment of the present invention.

In FIG. 7, the visual image "T" of a trailing vehicle is shown as a reflection in the reflecting surface 10. A plurality of rectangular boxes 11a–11d are shown on the surface of the reflecting surface 10 which indicate the sizes of a reflection of a trailing vehicle at predetermined distances behind the vehicle. The rectangular boxes 11a–11d can alternatively be displayed as circles, ellipses, or any other marking means for corresponding to estimated sizes of reflections of the vehicle which is trailing the racing vehicle at a plurality of predetermined distances.

In operation, at the beginning of a race a driver would adjust the angular position of the reflecting surface 10 according to an estimated location of the opposing vehicle at a predetermined time or distance from the end of the race, for example, one second from the end of the race. The angular position of the mirror can be determined from the driver's experience with respect to estimated minimum elapsed times of opponents' cars, or can be charted so that the driver would know to set the angular position to one of the numeral indicators 36 which are provided on the transparent plate 30. As shown in FIG. 6, the wing nut 70 would be rotated on the angle adjusting shaft in order to loosen and retighten the fastener to adjust the angle, or, alternatively, the angular position of the reflecting surface 10 can be adjusted by a cable actuating member 90 as illustrated in FIGS. 2 and 8 where a cable 92 is connected between the actuator 90 and the shaft 18 of the mirror apparatus. As another alternative, a motorized mirror pivoting device could be utilized for adjusting the angular position of the reflecting surface 10.

The driver would then set the time for the indicator means 44. A flow chart of the operation of the indicator means is shown in FIG. 9. In FIG. 9, step S200 requires the driver to set the timer. The timer would be set for approximately one second prior to the driver's vehicle reaching the finish line. Alternatively, a distance from the starting line or the finish line may be used to determine when the indicator means 44 is activated. Thus, either dimension, time or distance, may be used for determining when to activate the indicator means. In addition, the indicator means 44 can also deliver an audible signal as opposed to a visual signal.

In step S202 the control system asks if the petal is depressed beyond a predetermined position. In other words, at the start of a race the accelerator pedal is almost always immediately depressed to a position of at least, for example, 80%. Thus, the predetermined amount would be set to be 80% so that when the pedal is depressed beyond that point the system would know to begin the timer as shown in step S204. The control system would then ask if the predetermined time which was set in step S200 has been reached, as shown in step S208. If the predetermined time has been reached, the control system sends the signal to turn the indicator light "on" as shown in step S210. When the indicator light 44 is illuminated, the driver knows that he is, for example, one second away from the finish line at which time he can note the reflection of the trailing vehicle in the reflecting surface 10 of the mirror apparatus, and make a determination, based upon the size of the reflection with respect to the markings 11a–11d, of whether he needs to speed up, slow down, or maintain his present speed. This determination would be based upon the driver's experience and his belief as to whether he himself has had a good start or a bad start and whether he considers that the opposing vehicle is going too fast to finish within its estimated minimum elapsed time.

The invention being thus described, it will be obvious that the same may be varied in many ways. For example, the mirror apparatus may be mounted on the exterior of the doors in the typical location of a mirror on a standard vehicle, with the mirror having a plurality of markings thereon which correspond to estimated sizes of a reflection of a vehicle which is trailing the vehicle at a plurality of predetermined distances. Such variations are not to be regarded as a departure from the spirit and scope of the invention, and all such modifications as would be obvious to one skilled in the art are intended to be included within the scope of the following claims.

What is claimed is:

1. A racing mirror apparatus for use in a racing vehicle, comprising:
    a reflecting surface having at least one set of markings thereon which corresponds to an estimated size of a reflection of a vehicle which is trailing said racing vehicle at a predetermined distance;
    support means for pivotally supporting said reflecting surface;
    adjustment means for adjusting an angular position of said reflecting surface with respect to said support means; and
    indicator means for providing an electronically generated signal which indicates to a driver of said racing vehicle when said racing vehicle is at a predetermined time or distance from a beginning or end of a race.

2. The racing mirror apparatus of claim 1, wherein said at least one set of markings on said reflecting surface includes a plurality of sets of markings which correspond to estimated sizes of a reflection of a vehicle which is trailing said racing vehicle at a plurality of predetermined distances.

3. The apparatus of claim 1, wherein said adjustment means includes a transparent plate having a slot disposed therein, a shaft attached to said reflecting surface and received within said slot, and fixing means for fixing said shaft at a chosen position within said slot.

4. The apparatus of claim 3, wherein said shaft has a threaded portion which is engaged by said fixing means.

5. The apparatus of claim 3, wherein said transparent plate is mounted in front of said reflecting surface.

6. A racing mirror apparatus for use in a bracket racing vehicle, comprising:
    a reflecting surface including at least one set of markings thereon which corresponds to an estimated size of a reflection of a vehicle which is trailing said racing vehicle at a predetermined distance;
    support means for supporting said reflecting surface; and
    adjustment means for adjusting an angular position of said reflecting surface, said adjustment means including a transparent plate having a slot disposed therein, a shaft attached to said reflecting surface and received within said slot, and fixing means for fixing said shaft at a chosen position within said slot.

7. The racing mirror apparatus of claim 6, wherein said at least one set of markings includes a plurality of markings which correspond to estimated sizes of a reflection of a vehicle which is trailing said racing vehicle at a plurality of predetermined distances.

8. The racing mirror apparatus of claim 6, further comprising indicator means for indicating when said racing vehicle has traveled a predetermined distance.

9. The racing mirror apparatus of claim 6, further comprising indicator means for indicating when said racing vehicle has traveled a predetermined time.

10. The racing mirror apparatus of claim 6, wherein said shaft has a threaded portion which is engaged by said fixing means.

11. The racing mirror apparatus of claim 6, wherein said transparent plate is mounted in front of said reflecting surface.

12. In combination a racing vehicle having a racing mirror, said combination comprising:
    a racing vehicle having a driver's compartment provided with at least one side door panel including an upper window opening portion and a lower wall portion, said lower wall portion having an opening therethrough; and
    a racing mirror including a reflecting surface and support means for supporting said reflecting surface adjacent to said opening in said lower wall portion of said at least one door panel;
    wherein a driver of said racing vehicle can view a reflection in said racing mirror through said opening in said lower wall portion of said, at least one side door panel.

13. The combination racing vehicle and racing mirror as in claim 12, wherein said opening in said lower wall portion is provided with a frontal, laterally extending housing portion which defines a cavity in which said mirror is at least partially disposed within.

14. The combination racing vehicle and racing mirror as in claim 12, wherein said reflecting surface includes at least one set of markings thereon which corresponds to an estimated size of a reflection of a vehicle which is trailing said racing vehicle at a predetermined distance.

15. The combination racing vehicle and racing mirror as in claim 14, wherein said at least one set of markings includes a plurality of sets of markings which correspond to estimated sizes of a reflection of a vehicle which is trailing said race car at a plurality of predetermined distances.

16. The combination racing vehicle and racing mirror as in claim 12, further comprising adjustment means for adjusting an angular orientation of said reflecting surface.

17. The combination racing vehicle and racing mirror as in claim 16, wherein said adjustment means includes a cable actuator.

18. The combination racing vehicle and racing mirror as in claim 16, wherein said adjustment means includes a transparent plate mounted on a side of said reflecting surface opposite said opening in the lower wall portion of the door panel and having a slot disposed therein, a shaft attached to said mirror and received within said slot, and fixing means for fixing said shaft at a chosen position within said slot.

19. The combination racing vehicle and racing mirror as in claim 12, further comprising indicator means for indicating when said racing vehicle is a predetermined dimension from a beginning or end of a race.

20. The combination racing vehicle and racing mirror as in claim 19, wherein said indicator means includes a switch in communication with an accelerator pedal of said racing vehicle which initiates the indicator means when the accelerator pedal is depressed beyond a predetermined position.

* * * * *